United States Patent
Gallandat et al.

(10) Patent No.: US 11,440,796 B2
(45) Date of Patent: Sep. 13, 2022

(54) METAL HYDRIDE COMPRESSOR CONTROL DEVICE AND METHOD

(71) Applicant: ECOLE POLYTECHNIQUE FEDERALE DE LAUSANNE (EPFL), Lausanne (CH)

(72) Inventors: Noris Gallandat, Sion (CH); Andreas Züttel, Sion (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 188 days.

(21) Appl. No.: 16/956,742

(22) PCT Filed: Nov. 16, 2018

(86) PCT No.: PCT/EP2018/081628
§ 371 (c)(1),
(2) Date: Jun. 22, 2020

(87) PCT Pub. No.: WO2019/120800
PCT Pub. Date: Jun. 27, 2019

(65) Prior Publication Data
US 2021/0009410 A1    Jan. 14, 2021

(30) Foreign Application Priority Data
Dec. 22, 2017    (EP) ..................... 17209981

(51) Int. Cl.
*C01B 3/00*    (2006.01)
(52) U.S. Cl.
CPC .................. *C01B 3/0031* (2013.01)
(58) Field of Classification Search
CPC ....... C01B 3/0031; Y02E 60/32; F04B 19/24; F04B 15/00; F04B 19/06; F04B 37/02; F04B 37/18
See application file for complete search history.

(56) References Cited

U.S. PATENT DOCUMENTS

| | | | |
|---|---|---|---|
| 3,516,263 A | | 3/1970 | Wiswall |
| 4,556,551 A | * | 12/1985 | Wallace ................ C01B 3/0031 |
| | | | 420/583 |

(Continued)

FOREIGN PATENT DOCUMENTS

| | | | | |
|---|---|---|---|---|
| DE | 102005004590 A1 | * | 8/2006 | ........... C01B 3/0031 |
| DE | 102005004590 A1 | | 8/2006 | |

(Continued)

OTHER PUBLICATIONS

Third Party Observations Apr. 9, 2020.

(Continued)

*Primary Examiner* — Steven J Bos
*Assistant Examiner* — Syed T Iqbal
(74) *Attorney, Agent, or Firm* — Thomas Coester Intellectual Property

(57) ABSTRACT

The present relates to a Metal hydride compressor control method for generating a variable output pressure $P_{desired\_outPut}$, comprising a first step of inflowing gaseous hydrogen into a metal hydride compartment at a constant temperature and then stopping the gaseous hydrogen inflow, a second step of heating the metal hydride to a predetermined temperature which corresponds to a temperature which passes through the α+β phase at the desired output pressure $P_{desired\_outPut}$, a third step of opening the output connection of the compressor and keeping it at a constant pressure by regulating the temperature to keep a constant output pressure $P_{desired\_outPut}$ until the system completely leaves the α+β phase.

8 Claims, 1 Drawing Sheet

(56) References Cited

U.S. PATENT DOCUMENTS

2004/0042957 A1    3/2004  Martin
2010/0230292 A1    9/2010  Kelly et al.

FOREIGN PATENT DOCUMENTS

| SU | 360594       | 12/1972 |
| SU | 1266097      | 10/1984 |
| SU | 1467930      | 5/1987  |
| WO | 03006874 A1  | 1/2003  |
| WO | 2010087723 A1| 8/2010  |
| WO | 2012114229 A1| 8/2012  |

OTHER PUBLICATIONS

Sandrock G. Hydrogen—Metal Systems, in: Hydrogen Energy System, Kluwer Academic Publishers, 1995, pp. 135-166—Aug. 21, 1994 (Aug. 21, 1994).

Yu. F. Shmal'Ko, et al—Metal-hydride systems for processing hydrogen isotopes for power plants, Materials Science, vol. 37, No. 5,2001, pp. 689-706—Jun. 21, 2000 (Jun. 21, 2000).

Yartys V.A, et al.—Metal hydride hydrogen compression: recent advances and future prospects, AppliedPhysics A, vol. 122, 2016, article 415—Mar. 17, 2016 (Mar. 17, 2016).

Lototskyy M, et al.—Metal hydride hydrogen compressors: A review, International Journal of Hydrogen Energy, vol. 39, 2014, pp. 5818-5851—Feb. 26, 2014 (Feb. 26, 2014).

* cited by examiner

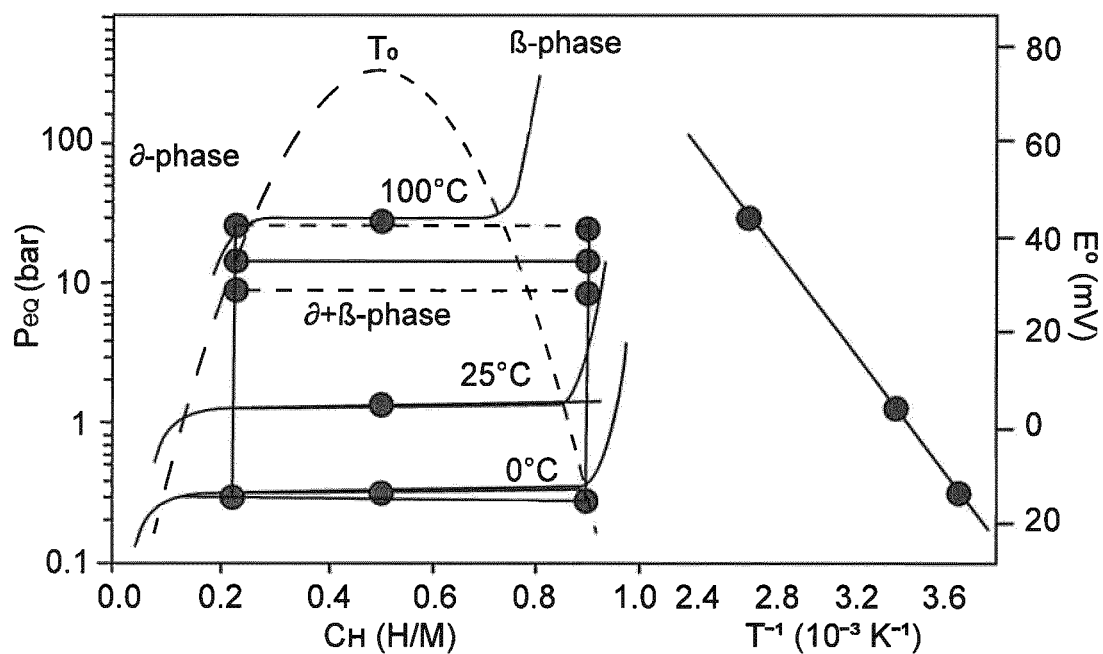

METAL HYDRIDE COMPRESSOR CONTROL DEVICE AND METHOD

TECHNICAL FIELD

The present invention relates to metal hydride based compressors and more particularly to single or multi-stage metal hydride based compressors with a variable output pressure.

BACKGROUND OF THE ART

Metal hydrides are commonly used for the storage of hydrogen under low pressures as many metals and alloys are capable of reversibly absorbing large amounts of hydrogen. Molecular hydrogen is dissociated at the surface before absorption and two H atoms recombine to H2 upon the desorption process. The thermodynamic aspects of hydride formation from gaseous hydrogen are described by pressure composition isotherms shown in FIG. 1 and also with other characteristics known by the skilled person in the art.

The figure shows the pressure-concentration-temperature plot on the left and the logarithm of the equilibrium or plateau pressure against the reciprocal temperature on the right. The $\alpha$ phase is the phase before absorption and the $\beta$ phase is the phase once the metal is saturated with H. Inside the $\alpha+\beta$ phase, the pressure varies exponentially with the temperature. At the desired plateau temperature, heat is supplied to the metal hydride to start the desorption process and release gaseous hydrogen at the desired pressure.

Metal hydride compressors have been disclosed in different configurations. There exist metal hydride compressors operating with a single metal alloy as well as multi-staged compressors where different alloys are combined to allow for higher compression ratios. There are compressors operating in batch mode as well as compressors operating continuously. All of the compressors operate between a set of discrete temperature/pressure levels, meaning that they have fixed compression ratios.

For example, document WO 2012114229 presents a metal hydride compressor including one or several compression modules which are interconnected and comprising a gas-distributing system and a heat transfer system which includes both a hot fluid and a cold fluid system for heating and cooling respectively. The compressor is thermally driven using a control system that operates the switches in the flow systems as well as the circulation pumps. The control system operates two compression modules simultaneously with an opposite phase in order to provide a continuous outflow of pressurized hydrogen. The metal hydride compressor operates at a fixed compression ratio.

Further, document EP 2391846 relates to a device where multiple compression modules are operated simultaneously. Furthermore, excessive heat is permanently removed from the heat sink side at a medium temperature level.

Also, document WO 2003006874 discloses a combined bulk storage/single stage metal hydride compressor, a hydrogen storage alloy and a hydrogen transport/distribution system. The device is used for bulk storage of hydrogen as well as for compression of said hydrogen to levels greater than or equal to 1500 psi at a temperature of less than or equal to 200° C.

Finally, document DE102005004590 describes a cyclically operating metal hydride compressor, which is disclosed for the use in motor vehicles. It comprises a pressure-resistant tank filled with metal hydride and is cyclically adsorbing respectively desorbing hydrogen.

One of the main problems of the devices of these documents none of them can output a variable pressure.

In this regard, a primary object of the invention is to provide a single or multi-stage metal hydride based compressors with a variable output pressure and a method for driving it.

SUMMARY OF THE INVENTION

The above problems are solved by the present invention.

A first aspect of the invention is a metal hydride compressor control method for generating a variable output pressure $P_{desired\_output}$, comprising a first step of inflowing gaseous hydrogen into a metal hydride compartment at a constant temperature and then stopping the gaseous hydrogen inflow, a second step of heating the metal hydride to a predetermined temperature which corresponds to a temperature which passes through the $\alpha+\beta$ phase at the desired output pressure $P_{desired\_output}$ a third step of opening the output connection of the compressor and keeping it at a constant pressure by regulating the temperature to keep a constant output pressure $P_{desired\_output}$ until the system completely leaves the $\alpha+\beta$ phase.

According to a preferred embodiment of the present invention, the first step also comprises cooling the metal hydride to keep its temperature constant.

Preferably, the first step is continued until the border of the $\alpha+\beta$ phase is reached.

Advantageously, the temperature regulation is be done with a control approach chosen in the group including PID control, MIMO control or control with any number of inputs and outputs and different sensing devices.

According to a preferred embodiment of the present invention, the connection to the gaseous hydrogen source is closed using some closing means, e.g. a mechanical or electrical valve or any other closing mean.

Advantageously, the output connection of the compressor is opened with some opening/closing means, e.g. a valve or any other electrical, mechanical or electromechanical system Preferably, at the end of step three, when the $H_2$ has been completely outputted, the output connection is closed and the system is cooled down According to a preferred embodiment of the present invention, at the end of the cooling a further cycle starts again, possibly to generate a different pressure than in the previous cycle by choosing a different temperature T3 in the second step.

A second aspect of the invention is a metal hydride compressor adapted to work according to the metal hydride compressor control method according to the first aspect of the invention. The particular advantages of this device of the invention being similar to the ones of the method of the first aspect of the invention, they will not be repeated here.

Advantageously, the metal hydride compartments are adapted to continuous operation.

Preferably, the metal hydride compressor is a multi-stage metal hydride compressor.

According to a preferred embodiment of the present invention, each stage comprises different alloys in series to generate a higher compression ratio.

BRIEF DESCRIPTION OF THE DRAWINGS

Further particular advantages and features of the invention will become more apparent from the following non-limitative description of at least one embodiment of the invention which will refer to the accompanying drawings, wherein FIG. 1 represents a pressure-composition isothermal curve with Van't Hoff plot of the method of the present invention,

DETAILED DESCRIPTION OF THE INVENTION

The present detailed description is intended to illustrate the invention in a non-limitative manner since any feature of an embodiment may be combined with any other feature of a different embodiment in an advantageous manner.

The present invention relates to a single or multi-stage metal hydride compressor control method where the compression ratio is not fixed but can be varied or adjusted by a user.

More specifically, the hydrogen outflow pressure is regulated to the required level in some range of values by controlling the temperature with the method of the present invention. The single or multi-stage metal hydride compressor control method comprises a first step of inflowing gaseous hydrogen into a metal hydride compartment at a constant temperature T1=T2 while cooling the metal hydride the cooling method can be passive, e.g. by ambient convection, or active, e.g. via some liquid cooling path or forced, air convection. In FIG. 1, this step is represented by the state moving from point 1 along the isothermal until the border of the α+β phase is reached in point 2.

The temperature is monitored using for example a thermocouple or an RTD and the pressure is monitored using a conventional pressure sensor. Once point T2 is reached, the gaseous hydrogen inflow is stopped and the connection to the gaseous hydrogen source is closed using some closing means, e.g. a mechanical or electrical valve or any other closing mean.

At this point, in a second step, the metal hydride is heated to some pre-calculated or online-calculated temperature T3 at point 3 of FIG. 1, which corresponds to the temperature, which passes through the α+β phase at the desired output pressure $P_{desired\_output}$. In FIG. 3, this is represented by the vertical line joining point 2 to point 3. The temperature T3 depends on various parameters but the most significant ones are the material used and the desired output pressure $P_{desired\_output}$.

Once the desired output pressure $P_{desired\_output}$ is reached due to heating to T3, the output connection of the compressor is opened with some opening/closing means, e.g. a valve or any other electrical, mechanical or electromechanical system and the system is kept at a constant pressure by regulating the temperature. As a matter of fact, since the desorption reaction is endothermic, additional heat has to be provided to the system in order to maintain the pressure constant.

This regulation can be done with any control approach including Proportional, Integral, and derivative (PID) control, Multiple Inputs, Multiple Outputs (MIMO) control or control with any number of inputs and outputs and different sensing devices, most notably including one or several temperature and pressure sensing devices.

The system then moves along the isothermal from point 3 and at some point, it will again enter the α+β phase.

The system is then kept at the right temperature to guarantee a constant output pressure $P_{desired\_output}$ until it leaves the α+β phase at point 4.

When the latter step is finished, i.e. when the $H_2$ has been completely outputted, the output connection is closed and the system is cooled down to point 1 where the cycle starts again, possibly to generate a different pressure than in the previous cycle by choosing a different temperature T3 in step 2.

Another aspect of this invention relates to a single or multi-stage metal hydride compressor in which the above method is carried out. Such single or multi-stage metal hydride compressor has a variable output pressure $P_{desired\_output}$ which is kept constant (or variable according to some determined function of time) using temperature control in one or multiple areas of the device.

According to preferred embodiment, the metal hydride compressor is a multi-stage metal hydride where each stage comprises a different material and receives a desired $P_{desired\_output}$ as an input from the preceding stage.

Such a compressor can be used in applications where variable compression ratios are needed which include but is not limited to compressors for use in laboratories that provide compressed and/or purified hydrogen for experiments, compressors for use in industrial hydrogen compression applications, compressors for use in hydrogen gas stations and compressors for the use in hydrogen or metal hydride energy storage systems comprising fuel cells and/or electrolyzers.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This for example is particularly the case regarding the exact temperature used, the material used, the monitoring system, the number of stages, the temperature sensor and all the different apparatuses, which can be used in conjunction with the present invention.

The invention claimed is:

1. Metal hydride compressor control method for generating a variable output pressure $P_{desired\_output}$, comprising
    a first step of inflowing gaseous hydrogen into a metal hydride compartment at a constant temperature and then stopping the gaseous hydrogen inflow,
    a second step of heating the metal hydride to a predetermined temperature, which corresponds to a temperature, which passes through an α+β phase and leaves the α+β phase at the desired output pressure $P_{desired\_output}$
    a third step of opening an output connection of the compressor and keeping it at a constant pressure by regulating the temperature to keep a constant output pressure $P_{desired\_output}$ until the system completely leaves the α+β phase.

2. Metal hydride compressor control method according to claim 1, characterized in that the first step also comprises cooling the metal hydride to keep its temperature constant.

3. Metal hydride compressor control method to claim 1 characterized in that the first step is continued until the border of the α+β phase is reached.

4. Metal hydride compressor control method according to claim 1 characterized in that the temperature regulation is done with a control approach chosen in the group including PID control, MIMO control or control with any number of inputs and outputs and different sensing devices.

5. Metal hydride compressor control method according to claim 1 to characterized in that a connection to a gaseous hydrogen source is closed using a closing means.

6. Metal hydride compressor control method according to claim 1 characterized in that the output connection of the compressor is opened with a opening/closing means.

7. Metal hydride compressor control method according to claim 1 characterized in that at the end of step three, when the $H_2$ has been completely outputted, the output connection is closed and the system is cooled down.

8. Metal hydride compressor control method according to claim 1 characterized in that at the end of the cooling a further cycle starts again, to generate a different pressure than in the previous cycle by choosing a different temperature T3 in the second step.

* * * * *